United States Patent
Lin et al.

(10) Patent No.: US 9,329,889 B2
(45) Date of Patent: May 3, 2016

(54) RAPID CREATION AND RECONFIGURATION OF VIRTUAL MACHINES ON HOSTS

(71) Applicant: VMware, Inc., Palo Alto, CA (US)

(72) Inventors: Yonghua Lin, Beijing (CN); Qiuhui Li, Beijing (CN); Junping Du, Beijing (CN); Xiaoding Bian, Beijing (CN); Guang Lu, Beijing (CN)

(73) Assignee: VMware, Inc., Palo Alto, CA (US)

( * ) Notice: Subject to any disclaimer, the term of this patent is extended or adjusted under 35 U.S.C. 154(b) by 228 days.

(21) Appl. No.: 14/231,330

(22) Filed: Mar. 31, 2014

(65) Prior Publication Data

US 2015/0277952 A1    Oct. 1, 2015

(51) Int. Cl.
G06F 9/455        (2006.01)

(52) U.S. Cl.
CPC .. *G06F 9/45558* (2013.01); *G06F 2009/45562* (2013.01)

(58) Field of Classification Search
None
See application file for complete search history.

(56) References Cited

U.S. PATENT DOCUMENTS

| | | | | |
|---|---|---|---|---|
| 7,904,493 B2* | 3/2011 | Schmelter | ........... | G06F 12/0253 707/819 |
| 8,826,033 B1* | 9/2014 | Krishnaprasad | ...... | G06F 21/554 713/187 |
| 2010/0049930 A1* | 2/2010 | Pershin | ............... | G06F 11/1451 711/162 |
| 2010/0058335 A1* | 3/2010 | Weber | ................. | G06F 9/45533 718/1 |
| 2010/0077160 A1* | 3/2010 | Liu | ........................ | G06F 3/0482 711/162 |
| 2010/0299309 A1* | 11/2010 | Maki | ................... | G06F 11/1479 707/640 |
| 2011/0010515 A1* | 1/2011 | Ranade | ............... | G06F 11/1451 711/162 |

* cited by examiner

*Primary Examiner* — Edward Dudek, Jr.
*Assistant Examiner* — Matthew Chrzanowski
(74) *Attorney, Agent, or Firm* — Patterson & Sheridan LLP (57) ABSTRACT

A rapid virtual machine (VM) cloning technique is provided that creates cloned VMs on hosts from multiple source VMs, rather than a single source VM that may otherwise be a bottleneck. The described technique selects particular hosts, disposed in particular racks, on which to create VM clones in a dynamic manner that reduces total deployment time for the plurality of VMs. A rapid VM reconfiguration technique is also provided that reduces the time spent reconfiguring the provisioned VMs for use in a distributed computing application.

20 Claims, 5 Drawing Sheets

RAPID CREATION AND RECONFIGURATION OF VIRTUAL MACHINES ON HOSTS

BACKGROUND

Distributed computing platforms, such as Hadoop or other MapReduce-related frameworks, include software that allocates computing tasks across a group, or "cluster," of distributed software components executed by a plurality of computing devices, enabling large workloads (e.g., data sets) to be processed in parallel and more quickly than is generally feasible with a single software instance or a single device. Such distributed computing platforms typically utilize a distributed file system that can support input/output-intensive distributed software components running on a large quantity (e.g., on the order of thousands) of computing devices to access a large quantity (e.g., petabytes) of data. For example, a data set to be analyzed by Hadoop may be stored within a Hadoop Distributed File System (HDFS) that is typically used in conjunction with Hadoop, which enables various computing devices running Hadoop software to simultaneously process different portions of the file.

Such distributed computing platforms may be deployed in a virtualized environment by provisioning many virtual machines (VM) for executing the distributed software components. However, provisioning so many virtual machines may be time-consuming and administratively prohibitive.

DETAILED DESCRIPTION

Figure 1:
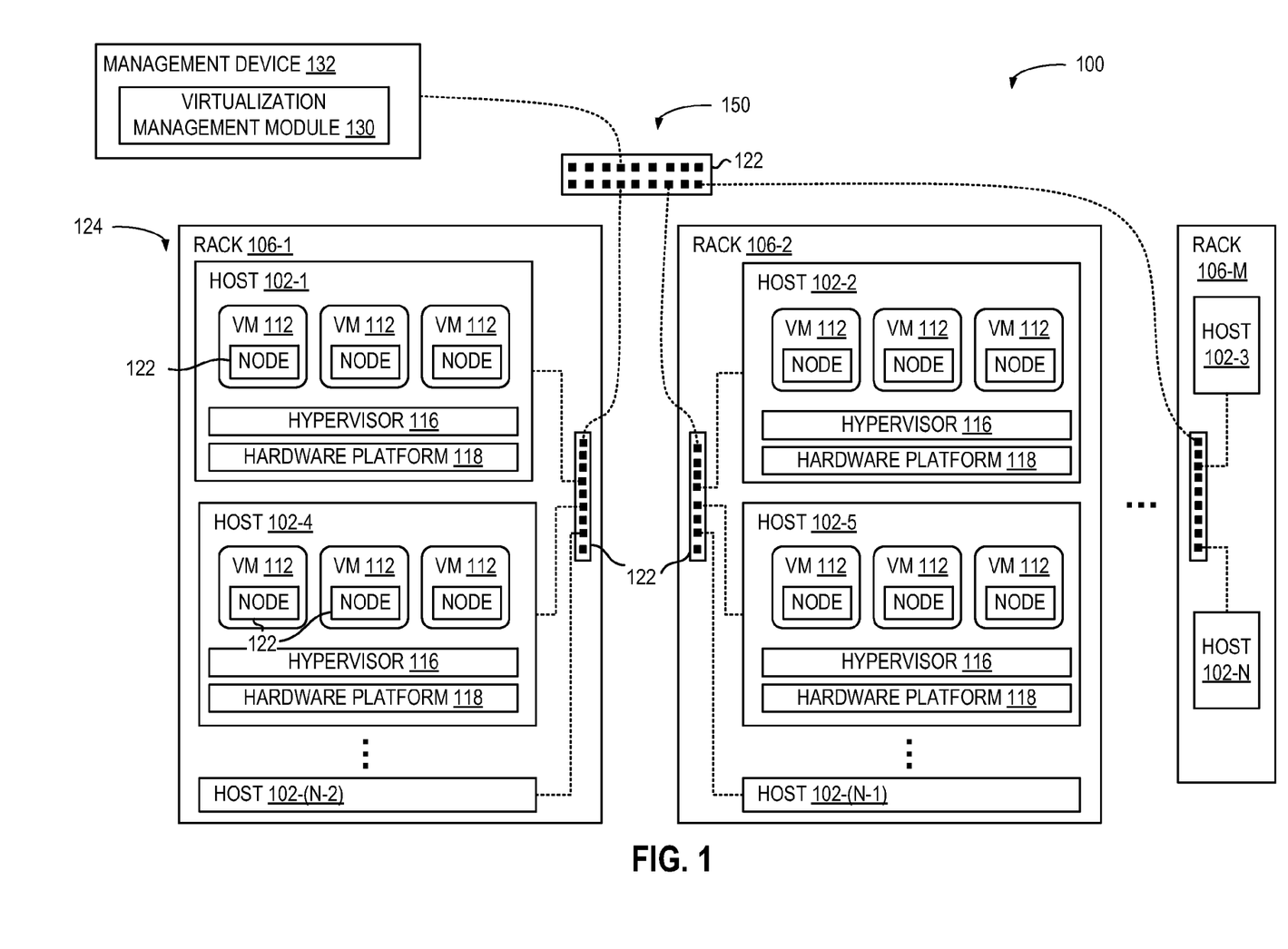
FIG. 1 is a block diagram that illustrates a virtualized computing system with which one or more embodiments of the present disclosure may be utilized.

FIG. 1 is a block diagram that illustrates a computing system 100 with which one or more embodiments of the present disclosure may be utilized. As illustrated, computing system 100 includes a plurality of host computers (identified as hosts 102-1, 102-2, 102-3, 102-4, ... 102-N) and referred to collectively as hosts 102. Hosts 102 may be arranged in a plurality of racks 106 (identified as racks 106-1, 106-2, ... 106-M) and referred to collectively as racks 106. In one embodiment, hosts 102 placed in a same rack 106 are communicatively coupled to a common rack switch 122, and rack switches 122 are communicatively coupled via a data center switch 120 to form a network 150.

Each host 102 is configured to provide a virtualization layer that abstracts processor, memory, storage, and networking resources of a hardware platform 118 into multiple virtual machines (VMs) 112 that run concurrently on the same host 102. The VMs 112 run on top of a software interface layer, referred to herein as a hypervisor 116, that enables sharing of the hardware resources of host 102 by the VMs 112. One example of hypervisor 116 that may be used in an embodiment described herein is a VMware ESXi hypervisor provided as part of the VMware vSphere solution made commercially available from VMware, Inc.

In one embodiment, computing system 100 includes a virtualization management module 130 that may communicate to the plurality of hosts 102 via network 150. In one embodiment, virtualization management module 130 is a computer program that resides and executes in a central server, such as a management device 132 residing in computing system 100, or alternatively, running as a VM in one of hosts 102. One example of a virtualization management module 130 is the vCenter® Server product made available from VMware, Inc. Virtualization management module 130 is configured to carry out administrative tasks for the computing system 100, including managing hosts 102, managing VMs running within each host 102, provisioning VMs, migrating VMs from one host to another host, and load balancing between hosts 102. In one embodiment, virtualization management module 130 is configured to communicate with hosts 102 to collect performance data and generate performance metrics (e.g., counters, statistics) related to availability, status, and performance of hosts 102 and VMs 112.

In one embodiment, computing system 100 supports execution of a distributed computing application 124 configured to perform large-scale processing and analysis of data using a plurality of nodes 122 working in parallel. In the embodiment shown, VMs 112 may be configured to serve as nodes 122 generated and managed by distributed computing application 124 that distributes a workload over the nodes. VMs 112 executing as nodes 122 on a host 102 are shown in greater detail in FIG. 2.

Figure 2:
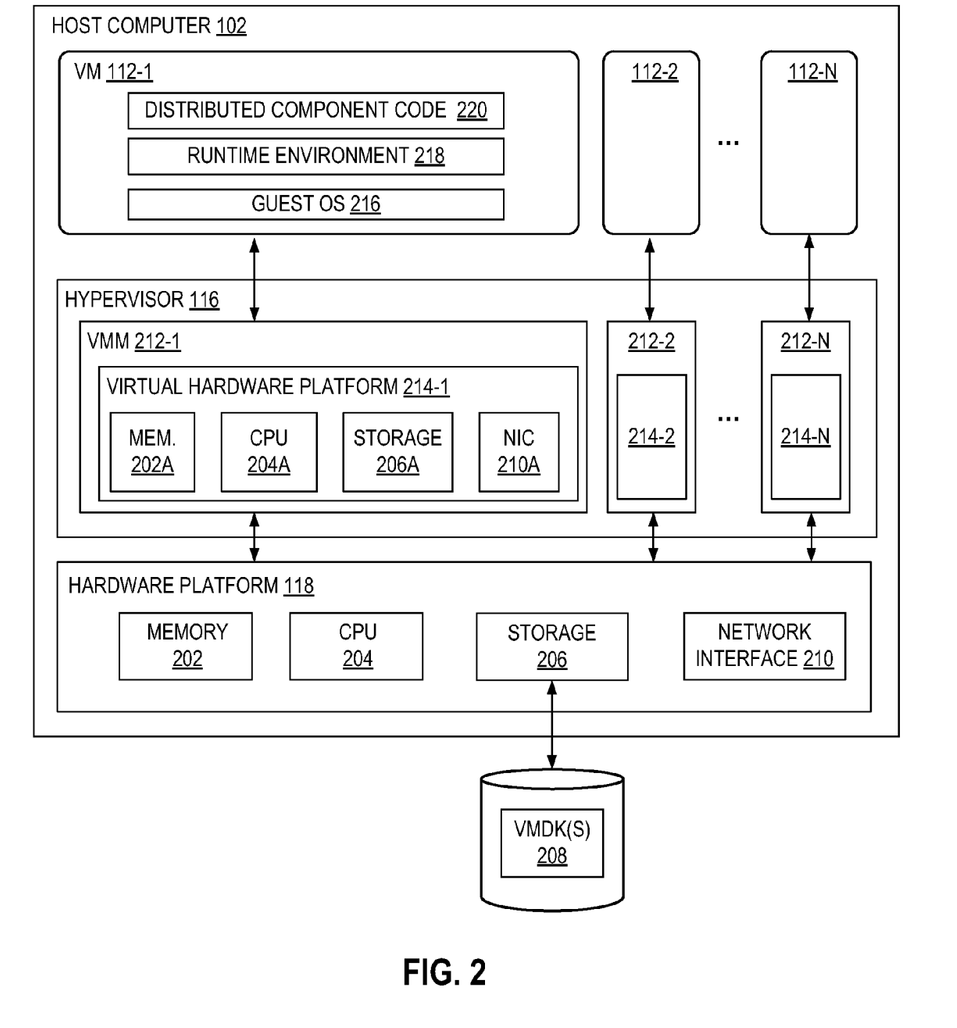
FIG. 2 is a block diagram that illustrates a host computer supporting one or more virtual machines, according to one embodiment of the present disclosure.

FIG. 2 is a block diagram that illustrates a host computer 102 supporting one or more virtual machines 112 that may serve as nodes of a distributed computing application 124, according to one embodiment of the present disclosure. As shown, hardware platform 118 of each host 102 may include conventional components of a computing device, such as a memory 202, a processor 204, storage 206, and a network interface 210. Storage 206 may represent local storage devices (e.g., one or more hard disks, flash memory modules, solid state disks, and optical disks) and/or a storage interface that enables host 102 to communicate with one or more network data storage systems that may, for example,. Examples of storage interface are a host bus adapter (HBA) that couples host 102 to a storage area network (SAN) or a network file system interface. Network interface 210 enables host 102 to communicate with another device via a communication medium, such as via rack switches 122 of network 150. An example of network interface 210 is a network adapter, also referred to as a Network Interface Card (NIC). In some embodiments, a plurality of NICs is included in network interface 210.

As described earlier, virtual machines (e.g., VMs 112-1 to 112-N) run on top of a hypervisor 116 that enables sharing of the resources of hardware platform 118 of host 102 by the virtual machines. Hypervisor 116 may run on top of the operating system of host 102 or directly on hardware components of host 102. Hypervisor 116 provides a device driver layer configured to map physical resource of hardware platforms 118 to "virtual" resources of each VM 112 such that each VM 112-1 to 112-N has its own corresponding virtual hardware platform (e.g., a corresponding one of virtual hardware platforms 214-1 to 214-N). Each such virtual hardware platform 214 provides emulated hardware (e.g., memory 202A, processor 204A, storage 206A, network interface 210A, etc.) that may, for example, function as an equivalent, conventional hardware architecture for its corresponding VM 112. Virtual hardware platforms 214-1 to 214-N may be considered part of virtual machine monitors (VMMs) 212-1 to 212-N which implement virtual system support to coordinate operations between hypervisor 116 and corresponding VMs 112-1 to 112-N.

In the embodiment depicted in FIG. 2, each VM 112 includes a guest operating system (OS) 216 (e.g., Microsoft Windows, Linux) and one or more guest applications running on top of guest OS 216. In one embodiment, each VM 112 includes a runtime environment 218, such as a Java Virtual Machine (JVM), that supports execution of a distributed software component code 220 (e.g., Java code) for distributed computing application 124. In some embodiments, distributed software component code 220 may implement functionality of "data nodes", for storing data distributed across virtualized computing system 100, and functionality of "compute nodes" for processing the distributed data. For example, if distributed computing application 124 is a Hadoop application, a VM 112 may have a runtime environment 218 (e.g., JVM) that executes distributed software component code 220 implementing at least one of a Job Tracker" function, "TaskTracker" function, "Name Node" function, and "Data Node" function. Alternatively, each VM 112 may include distributed software component code 220 for distributed computing application 124 configured to run natively on top of guest OS 216.

In some embodiments, a "primary" virtual disk accessed by a VM 112 is represented by emulated storage 206A and implemented as a file 208 stored in storage 206 of hardware platform 118. One example of a format for a virtual disk file is the ".vmdk" file format developed by VMware although it should be recognized that any virtual disk file format may be utilized consistent with the teachings herein. Such a primary virtual disk, which may be referred to as a boot disk, includes guest OS 216, runtime environment 218, and distributed software component code 220.

To deploy a distributed computing application, such as Hadoop and Hbase, multiple nodes on a plurality of hosts using local disks are created as an initial step. The nodes may be configured for different functionality and may not be homogenous, for example, having different CPU and memory configurations, as well as different data disk sizes, for Name Nodes and for Data Nodes. As such, to deploy the distributed computing application 124 in a virtualized environment, such as the system 100, the virtualization management module 130 generates large numbers of VMs by "cloning" a common source VM (e.g., another VM, a VM template), and then reconfigures the VMs based on requirements of the nodes and other user requirements.

In one or more embodiments, the virtualization management module 130 may create a full clone or a linked clone of a source VM. A full clone refers to an independent copy of a source VM, while a linked clone refers to a copy of a VM that shares virtual disks with the source VM ("parent VM") in an ongoing manner. As used herein, a source VM refers to a VM designated to be copied during a cloning operation. A target VM refers to the resulting copy that is created. The source VM used for cloning may be an instance of an ordinary virtual machine or a VM template, which is a master image of a VM for creating and provisioning virtual machines. VM templates are similar to VMs, but may not be powered on or edited easily. A full clone of a VM is created by making copies of one or more files and other data associated with the execution and state of the VM, including one or more virtual disk files 208 (e.g., VMDK files) that store the contents of source VM's virtual disks 206A, and other VM-related files of the source VM (e.g., VM-related configuration files, paging files, and log files of the VM's activity). A linked clone is made from a snapshot of the parent VM. All files available on the parent VM at the moment of the snapshot continue to remain available to the linked clone. Ongoing changes to the virtual disk of the parent VM do not affect the linked clone, and changes to the disk of the linked clone do not affect the parent VM.

Distributed computing applications (e.g., Hadoop) which are sensitive to application runtime performance may prefer to deploy full clones because, in some cases, linked clones may incur performance penalties as disk requests traverse the chain of one or more parent VMs. Further, linked clones need ongoing access to the virtual disk files of the parent VM (e.g., to handle disk read requests), which may introduce the requirement of a shared storage environment to create linked clones across physical hosts 108. However, virtual disk files 208 of a VM may be of a substantial size (e.g., 10 GB), as the boot disk may contain an installed instance of guest OS 216, runtime environment 218, distributed software component code 220, and other applications. As such, a large number of full clones may take a long time to create, especially across physical hosts over a network.

Rapid Virtual Machine Cloning

Accordingly, embodiments of the present disclosure provide techniques for rapidly creating multiple virtual machines on a plurality of hosts. In one or more embodiments, virtualization management module 130 is configured to execute a provisioning plan that specifies a target number of VMs 112 to be deployed on hosts 102 within computing system 100 based on a specified source VM. Virtualization management module 130 may generate the provisioning plan responsive to user input, or, in other embodiments, may receive a provisioning plan from a deployment utility application (not shown) configured to coordinate the deployment and installation of distributed computing application 124. The provisioning plan may specify a target number of VMs-per-host to be applied to a plurality of hosts, different target numbers of VMs for individual hosts, or in some embodiments, an overall target number of VMs and allow virtualization management module 130 to make the determination of how many VMs on which hosts should be deployed.

In one embodiment, virtualization management module 130 is configured to clone the target number of VMs from multiple sources, rather than from only a single source VM that may otherwise be a bottleneck. Virtualization management module 130 may be configured to maintain a list of VMs representing a pool of VMs that are available to be used as source VMs in cloning operations. Initially, the pool of available VMs may contain just the source VM or VM template specified by the provisioning plan to seed the entire deployment. After any VM is cloned, the VM clone may be added to the pool of VMs and later used as a source VM to create other VMs. As such, virtualization management module 130 is configured to use multiple sources for cloning VMs in a pipelined, parallel manner, in contrast to a conventional cloning operation in which all VMs are (serially) cloned from a single template.

Figure 3A:
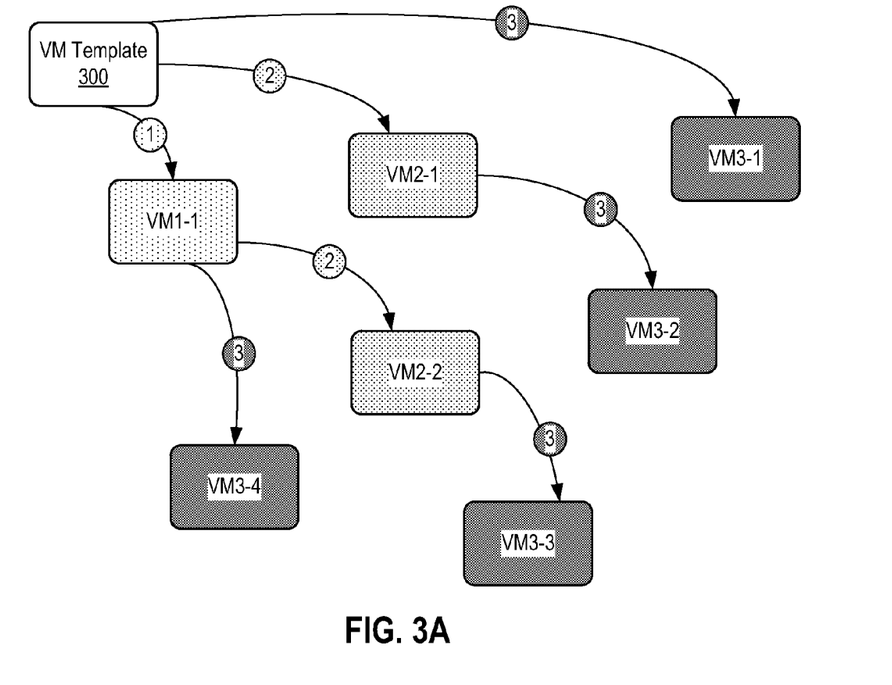
FIG. 3A is a block diagram depicting successive rounds of cloning operations from multiple sources, according to one embodiment of the present disclosure.

FIG. 3A is a block diagram depicting successive rounds of cloning operations from multiple sources, according to one embodiment of the present disclosure. As one example, virtualization management module 130 may execute a provisioning plan to create seven clone VMs on a plurality of hosts (not depicted) from a VM template 300. As shown, in a first round, the virtualization management module clones VM template 300 to create a first VM (identified as VM1-1). After the cloning operation is complete, the VM1-1 may be added to the pool of VMs that are available to be used as source VMs, as the VM1-1 is a clone of VM template 300 and can equally function as a source VM. In subsequent rounds, the virtualization management module may clone multiple source VMs from the pool of VMs in parallel.

For example, in the second round, virtualization management module 130 clones VM template 300 to create a second VM (identified as VM2-1), and concurrently clones the VM1-1 to create a third VM (identified as VM2-2). In a third round, virtualization management module 130 clones VM template 300 to create a VM fourth (identified as VM3-1); clones VM2-1 to create a fifth VM (identified as VM3-2); clones VM2-2 to create a sixth VM (identified as VM3-3); clones VM1-1 to create a seventh VM (identified as VM3-4). It is noted that using a pool of source VMs prevents the original VM template 300 from becoming a bottleneck during the deployment process.

Virtualization management module 130 may be configured to dynamically select a source VM to create a desired target VM based on conditions within and between hosts 102 of computing system 100, rather than adhering to a fixed plan set before VM creation began. For example, if the cloning of VM1-1 to create VM2-2 is going slowly and lagging, and all other VMs have finished cloning, virtualization management module 130 may begin to clone VM3-3 (which would have been otherwise cloned from the still-in-progress VM2-2) from the other finished VMs, e.g., VM3-2.

It is noted that "cross-host" cloning, in which a source VM and a target VM are on different hosts may take more time to complete than a cloning within the same host (i.e., "intra-host" cloning or "same-host" cloning) or within the same datastore (of a shared storage environment). In one instance of cross-host cloning from a source host to a target host, data of virtual disk files 308 has to be retrieved from storage 206 of the source host, passed through network interfaces 110 and the network to a target host, and written to storage 206 of the target host, which may be time consuming. Similarly, "cross-rack" cloning, in which a source VM and a target VM are on different hosts in different racks may take even more time to complete cloning as data copied must be transferred across rack switches 122 and data center switches 120, as discussed later.

Accordingly, in one embodiment, to fulfill a provisioning plan for a plurality of VMs created on a plurality of hosts, virtualization management module 130 is configured to, given a source VM on a source host, select a next target VM to be created based on the existing state of deployments in the source host itself and in the other hosts. One example algorithm for selecting clone sources and destinations is shown in FIG. 4.

Figure 3B:
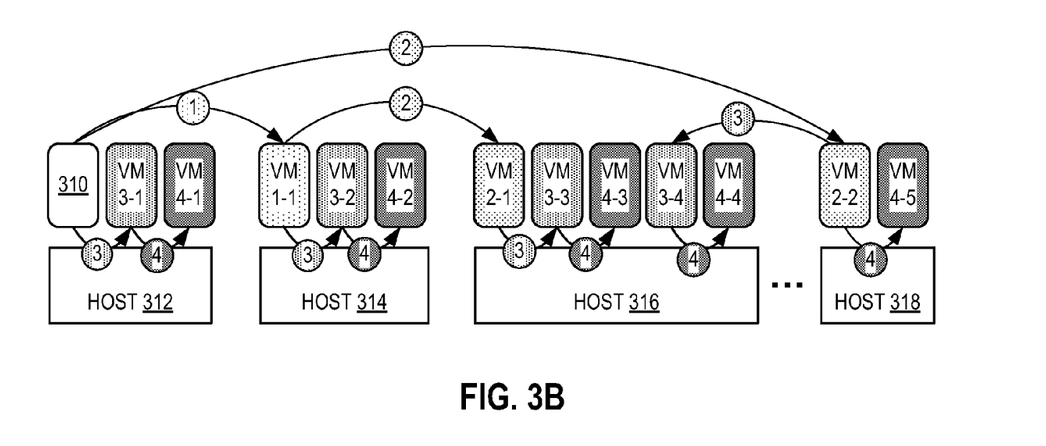
FIG. 3B is a block diagram depicting successive rounds of same-host and cross-host cloning operations from multiple sources, according to one embodiment of the present disclosure.
Figure 4:
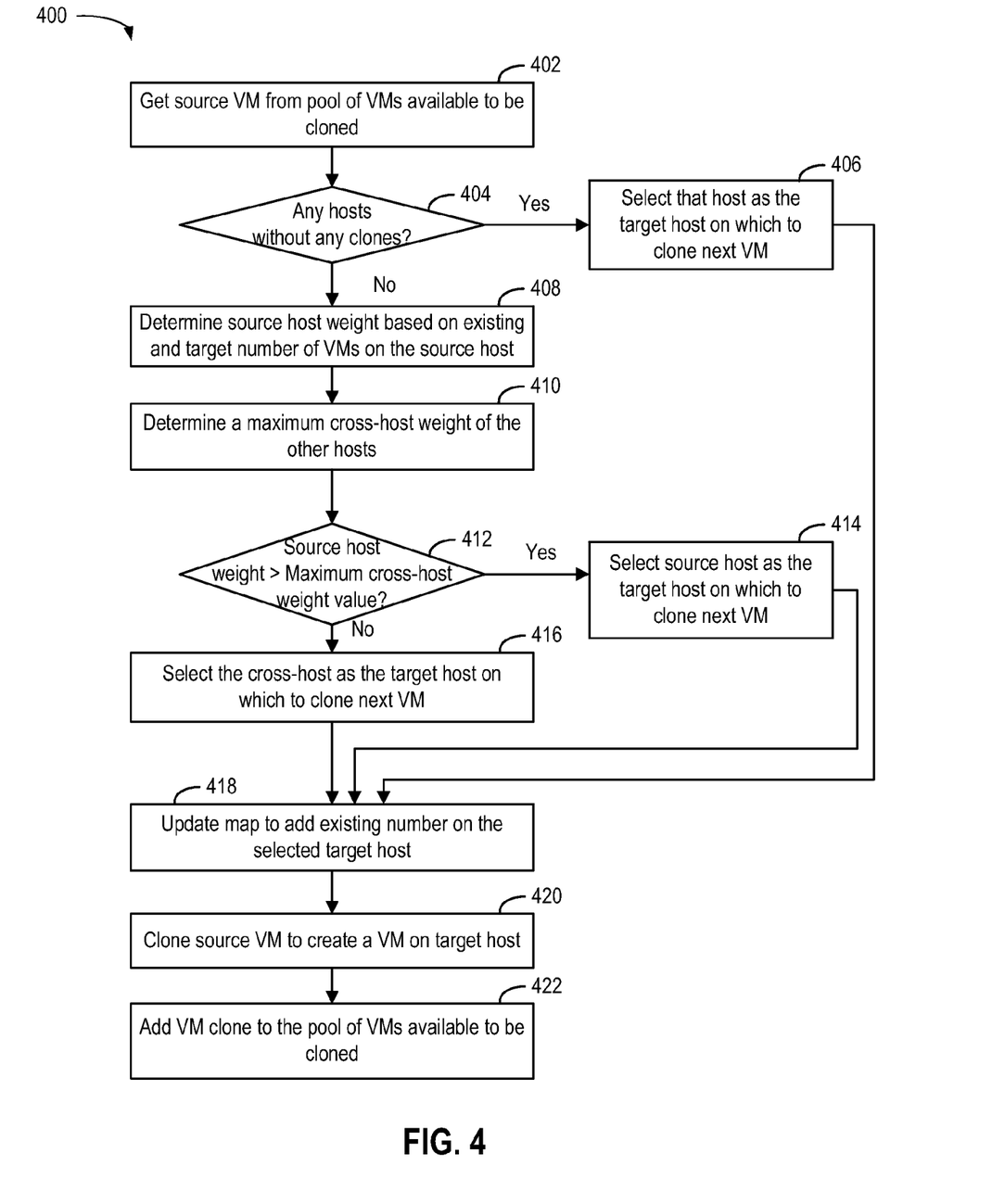
FIG. 4 is a flow diagram that illustrates steps for a method of cloning virtual machines in a plurality of hosts, according to an embodiment of the present disclosure.

FIG. 4 is a flow diagram that illustrates steps for a method 400 for provisioning a plurality of VMs in a plurality of hosts, according to an embodiment of the present disclosure. It should be recognized that, even though the method 400 is described in conjunction with the system of FIGS. 1-2, any system configured to perform the method steps is within the scope of embodiments of the disclosure. The method 400 is also described in conjunction with FIG. 3B, which is a block diagram depicting successive rounds of same-host and cross-host cloning operations from multiple sources, according to one embodiment of the present disclosure.

In one implementation, before any VM creation has started, virtualization management module 130 may initialize a deployment mapping, which is a data structure storing information for each of the plurality of hosts, including a target number of VMs to be created on each host (as provided by the provisioning plan) and an existing number of VMs created or being created on each host (initialized as zero). For each target VM to be created according to the provisioning plan, virtualization management module 130 may launch a corresponding thread or process to create a target VM. Each launched thread may perform the method 400 described below.

The method 400 begins at step 402, where virtualization management module 130 gets a source VM from a pool of VMs that are available to be cloned. The source VM may be a powered-off VM, a VM template, or a finished VM clone. VMs within the pool have identical copies of the same virtual disk 208 (i.e., boot disk), enable any of the VMs to serve alike as source VMs for cloning operations. As discussed above, the pool of VMs may be implemented as a list, maintained by virtualization management module 130 during the deployment process, of VMs which may be used as source VMs for cloning. In one implementation, the list of VMs may represent the plurality of VMs by a unique identifier (e.g., VM identifier), and on which host each of the VMs is located within computing system 100. Initially, the pool of VMs may contain just the original VM or VM template used to seed the entire deployment, and may grow and shrink during the deployment process. In one embodiment, responsive to retrieving the identity of a particular source VM from the pool of VMs, virtualization management module 130 may remove that source VM from the pool, or in other embodiments, mark the status of that source VM as "busy" or "unavailable." It is noted that if there are no source VMs available in the pool of VMs, this step may be blocked until a source VM becomes available.

At step 404, virtualization management module 130 determines whether there are any hosts 102 (in the provisioning plan) that do not have any VMs created or being created. If so, at step 406, virtualization management module 130 selects that host as the target host on which to clone a next VM, and proceeds to step 422. In this way, virtualization management module 130 clones VMs in a breadth-wise manner across hosts until all hosts in the provisioning plan have at least one cloned VM, based on the insight that enabling same-host cloning to occur on hosts early on in the deployment process allows the deployment process to be completed in less time overall.

In the example shown in FIG. 3B, in a first round of cloning, the virtualization management module clones VM template 310 on a first host 312 to create a first VM1-1 on a different host 314. As with the example in FIG. 3A, after the cloning operation is complete, the VM1-1 may be added to the pool of VMs that are available to be used as source VMs. In a second round of cloning, virtualization management module 130 clones the VM1-1 to create a second VM2-1 on the host (which does not have any VM clones yet) and concurrently clones VM template 310 to create a third VM2-2 on the host 318 in another cross-host cloning operation. At this point, all hosts 312, 314, 316, 318 have at least one VM clone created thereon.

Responsive to determining all hosts 102 have at least one VM created or creating, virtualization management module 130 can choose to clone the source VM on the source host on which the source VM resides (i.e., same-host cloning) or to clone the source VM on another host (i.e., cross-host cloning). In some cases, choosing to perform cross-host cloning "assists" that other host and may facilitate reaching the target numbers of VMs for all hosts in less time overall than would otherwise happen if only same-host cloning happened at this point. Virtualization management module 130 calculates how much time each host, including the source host and all other (cross-) hosts, will take to finish cloning, that is, to create the respective target number of VMs. Virtualization management module 130 then creates a VM (by cloning the source VM) on the host that needs the longest amount of time to finish their respective cloning.

For example, say the provisioning plan in the example of FIG. 3B specifies that the target number of VMs for hosts 312, 314, 316, 318 are 2 VMs, 3 VMs, 8 VMs, and 2 VMs, respectively. The deployment process may consume more time if the process waited for all eight VMs on host 316 to be created using only same-host cloning operations. As such, virtualization management module 130 determines that host 316 needs the longest amount of time to finish its respective cloning to create 8 VMs, and in the third round of cloning, performs a cross-host cloning operation to copy VM2-2 from host 318 to create a VM3-4 on host 316 (rather than perform a same-host cloning operation on host 318). This assistance provides host 316 with another possible source VM to be used to create more full clones concurrently. During the third round, the virtualization management module also clones VM template 310 on host 312 to create VM3-1 on the same host, and clones VM1-1 on host 314 to create VM3-2 on the same host (i.e., host 314), and clones VM2-1 on host 316 to create VM3-3 on the same host (i.e., host 316).

In a fourth round of cloning shown in FIG. 3B, the virtualization management module clones one of VMs (e.g., template 310, VM3-1) on host 312 to create VM4-1 on the same host, and clones a VM (e.g., VM1-1, VM3-2) on host 314 to create VM4-2 on the same host, thereby reaching the respective target number of VMs on host 312 and 314. Virtualization management module 130 clones VM2-1, VM3-3, and VM3-4 on host 316 to create additional VMs (e.g., VM4-3 and VM4-4) on the same host. The fifth round of cloning needed to reach the target eight VMs on host 316 is omitted for clarity. Further, the virtualization management module clones VM2-2 on host 318 to create VM 4-5 and reach the target 2 VMs on host 318.

It is noted that, in other embodiments, virtualization management module 130 may perform such cross-host cloning operations to assist other hosts after a source host has finished cloning and reached its target number of VMs. For example, virtualization management module 130 might first clone VM2-2 on host 318 to create the second VM on host 318 in the third round of cloning, meeting the target number of VMs, and then proceed to assist host 316 with cloning in subsequent rounds.

Referring back to FIG. 4, in one particular embodiment, virtualization management module 130 determines the time to finish VM cloning by calculating a weight value associated with each host, and selecting the host having highest weight. At step 408, virtualization management module 130 identifies the host on which the source VM resides (i.e., source host), and determines a source host weight for the source host based on the existing number of VMs currently on the source host and on the target number of VMs.

It is noted that the amount of time needed to complete VM cloning may be abstracted into rounds of cloning, in contrast to units of time like seconds or minutes. As such, the host weights may be calculated by Equation (1) and Equation (2), shown below, which represents the number of rounds of cloning needed for one host to finish VM cloning, that is, to create the target number of VMs given the existing number of VMs on the host.

In one implementation, the source host weight may be calculated according to Equation (1) shown below:

$$2^n m > T > 2^{n-1} m \tag{1}$$

where m is the existing number of cloned VMs on the source host, T is the target number of cloned VMs on the source host as specified by the provisioning plan, and n is the value of the source host weight. Equation (1) calculates the number of rounds needed to finish cloning, assuming an expansion of VMs from inside of the host only, where the number of VMs round-by-round would increase from 1 VM to 2 VMs, from 2 VMs to 4 VMs, from 4 VMs to 8 VMs, and so forth. By using the term $2^{n-1}m$ of Equation (1) as a lower bound to Equation (1), the source host weight value n may represent a minimum number of rounds of cloning needed to create the target number of VMs. In one example, if the target number of VMs in the source host is 5 VMs (i.e., T=5), and only one VM exists in the source host (i.e., m=1), the source host weight is calculated as the value n that satisfies the equation $(2^n*1)>5>(2^{n-1}*1)$. In this example, the source host weight is calculated to be 3 (i.e., 3 rounds of cloning) because $(2^3*1)=8>5>4=(2^{3-1}*1)$.

At step 410, virtualization management module 130 determines a maximum cross-host weight value for the other hosts 102 that are candidates for being the next target host. In one embodiment, virtualization management module 130 determines a host weight value for each of the other hosts 102 based on the respective existing number of VMs and the respective target number of VMs. In one implementation, as with the source host weight, the host weight values in step 410 may be calculated according to an Equation (2), shown below:

$$2^n(2m+1) > T > 2^{n-1}(2m+1) \tag{2}$$

where m is the existing number of cloned VMs on a host, T is the target number of cloned VMs on the host as specified by the provisioning plan, and the value of the cross-host weight is n+1.

Equation (2) calculates the number of rounds needed to finish cloning, assuming that, besides locally copying VMs from within the host, there is another host willing to copy a VM from itself. As such, the number of cloned VMs would grow as shown in Equation (3) below:

$$1 \to 2,\ 2 \to 4,\ 4=8+0 \to 1,\ 1 \to 2,\ 2 \to 4=1 \to 3,\ 3 \to 6,\ 6 \to 12 \tag{3}$$

In one example, if the target number of VMs in the candidate cross-host is 5 VMs (i.e., T=5), and one VM exists in the host (i.e., m=1), then the cross-host weight is calculated as the value n+1 that satisfies the equation $(2^n*(2*1+1))>5>(2^{n-1}*(2*1+1))$. In this example, the cross-host weight is calculated to be n+1=2 (i.e., 2 rounds of cloning) because $(2^1*3)=6>5>3=(2^{1-1}*3)$. Virtualization management module 130 calculates the host weight value for each of the other hosts, and selects the highest of those weight values, i.e., the maximum cross-host value.

At step 412, virtualization management module 130 determines whether the source host weight value is greater than the maximum cross-host weight value. If so, at step 414, virtualization management module 130 selects the source host as the target host on which to clone the next VM. This may represent a determination that a same-host cloning operation better serves the deployment process than attempting a cross-host cloning operation.

Otherwise, at step 416, responsive to determining the maximum cross-host weight value is greater than the source host weight, virtualization management module 130 selects the host having with the maximum cross-host weight value as the target host on which to clone the next VM. This may represent a determination that a cross-host cloning operation better serves the deployment process than performing a same-host cloning operation.

At step 418, virtualization management module 130 updates the deployment mapping to increment the existing number of VMs on the selected host, whether selected host is a host without any VM (i.e., step 406), or is the source host (i.e., step 414), or is a cross-host (i.e., step 416).

At step 420, virtualization management module 130 clones the source VM to create a VM on the selected target host. In some embodiments, virtualization management module 130 clones the source VM by copying one or more of virtual disk files 208 associated with the source VM to storage of the target host, in cases where a full clone is desired. In other embodiments, virtualization management module 130 may create a linked clone of the source VM on the target host, or some mixture of linked clones and full clones, as configured by the provisioning plan.

At step 422, virtualization management module 130 adds the VM clone (created in step 420) to the pool of VMs that may be used as source VMs. Virtualization management module 130 may return the source VM back to the pool of VMs, or in some embodiments, mark the status of the source VM as "available" for cloning operations within the list maintained by virtualization management module 130.

While the technique described in method 400 selects destinations for clone based on VM location (in hosts), embodiments may be extended to select destinations for clone based on host location (in different racks 106). It is noted that bandwidth across racks 106 (i.e., through switch 120) may be as influential in the speed of a deployment process as bandwidth between hosts 102. For example, if VM cloning is performed without regard for the network issue, hundreds of VMs may be cloned between racks at the same time, and the rack network may become a bottleneck.

Accordingly, the algorithms described above may be extended to add rack awareness to VM cloning. Virtualization management module 130 may maintain a mapping of the location of hosts 102 within racks 106, and the location of VMs 112 within hosts 102. In some embodiments, rack information and host information may be determined by automatic topology awareness using neighbor device discovery protocols, such as IEE 802.1AB Link Layer Discovery Protocol (LLDP) or Cisco Discovery Protocol (CDP). Such discovery protocols enable a network device to advertise information about themselves to other devices on the network. In other embodiments, rack information and host information may be specified by a provisioning plan provided by a deployment utility application for distributed computing application 124.

The method 400 may be modified such that virtualization management module 130 considers cloning VMs across racks first, and then attempts to clone VMs inside of a rack. For example, in one embodiment, rather than first considering cloning VMs cross-host first (i.e., in steps 404-406), virtualization management module 130 considers whether there are any racks with hosts (in the provisioning plan) that do not have any VMs created or being created. If so, virtualization management module 130 selects that rack and a host on that rack as the target host on which to clone a next VM. Otherwise, virtualization management module 130

Responsive to determining all racks 106 have at least one host with a VM created or being creating, virtualization management module 130 can proceed to perform the steps 408-422, except limited to hosts in the same rack as the source VM. In other words, virtualization management module 130 may proceed to choose to clone the source VM on the source host on which the source VM resides or to clone the source VM on another host in the same rack as the source host. As such, virtualization management module 130 determines a maximum cross-host weight value for the other hosts 102 that are in the same rack as the source host.

Rapid Virtual Machine Reconfiguration

As mentioned earlier, after a VM has been cloned, one or more additional steps may need to be performed to complete the creation of a VM. In one embodiment, virtualization management module 130 may reconfigure a VM clone to prepare that VM for use as a node 120 within distributed computing application 124 as specified by the provisioning plan, such as attaching data disks, configuring CPU and memory sizes, acquiring IP addresses, etc. However, in cases where VM configuration is only performed after all VM cloning has finished, broadcast storms may result and certain services (e.g., virtualization management module 130, Dynamic Host Configuration Protocol (DHCP) server) may become a bottleneck. Accordingly, embodiments of the present disclosure provide a technique for rapidly reconfiguring one or more VMs during a deployment process.

Figure 5:
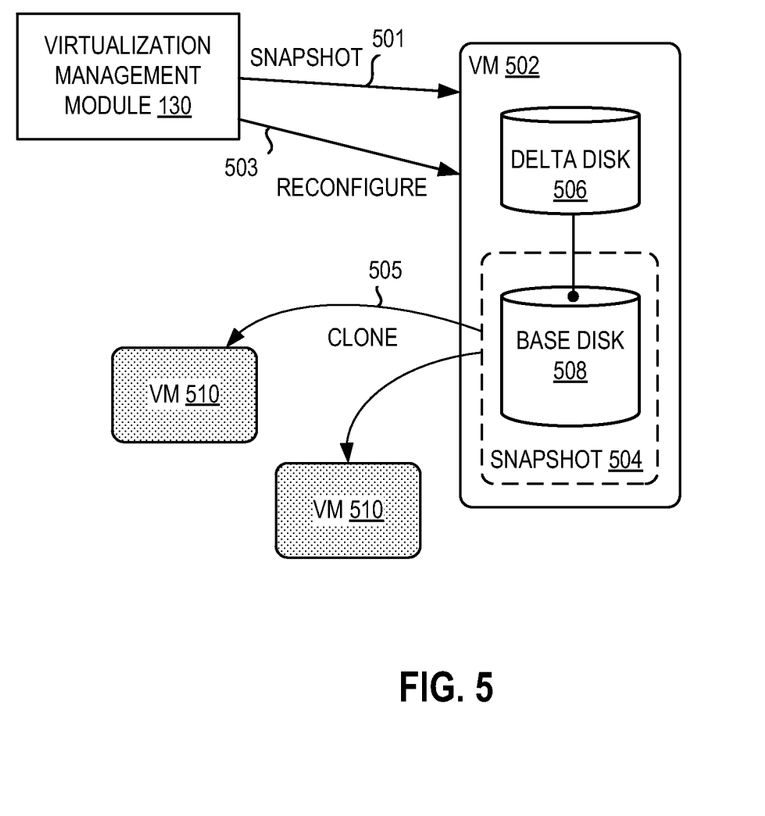
FIG. 5 is a block diagram illustrating a technique for reconfiguring virtual machines while cloning the virtual machines, according to embodiments of the present disclosure.

FIG. 5 is a block diagram depicting operations for reconfiguring one or more VMs during a deployment process, according to embodiments of the present disclosure. In one embodiment, after a VM 502 has finished cloning, at 501, virtualization management module 130 generates a snapshot 504 of the VM clone. In some embodiments, virtualization management module 130 generates a delta disk 506, sometimes also referred to as a redo log, which captures the differences between a current state of base disk 508 and the state that existed at the time the VM finished cloning. Base disk 508 represents the one or more virtual disk files 208 copied during the full cloning process, described earlier.

As shown in FIG. 5, virtualization management module 130 may start to clone the VM from the snapshot (at 505) to create one or more VMs 510, meanwhile reconfiguring VM 502 (at 503). It is noted that changes in state resulting from the reconfigurations (at 501) may be captured by delta disk 506, while snapshot 504 remains unchanged and continues to create identical VM clones. After all VM cloning has finished, i.e., the target number of VMs on each host as specified by the provisioning plan has been or is being created, snapshot 504 may be deleted and the data of delta disk 506 is merged with base disk 508.

In some embodiments, virtualization management module 130 may reconfigure VM 502 by attaching one or more data disks, which are separate from the virtual disk having guest OS 216 and applications that is copied during the cloning process, for use as a data node of distributed computing application 124. In another example, virtualization management module 130 may reconfigure VM 502 by configuring CPU and memory sizes for the VM, e.g., increasing the CPU allocation for a VM clone designated to be a compute node within distributed computing application 124. In another example, virtualization management module 130 may reconfigure the network settings of VM 502 to acquire an IP address from a DHCP server, and/or add, delete, or modify one or more NICs 210A of the VM clone. In another example, virtualization management module 130 may disable or enable VM-related resource management features such as load balancing, also referred to as distributed resource scheduling (DRS), and automatic failover, also referred to as fault tolerance (FT) or high availability (HA), which can augment or interfere with operations of distributed computing application 124 depending on the particular implementation.

Accordingly, embodiments of the present disclosure provide a reconfiguration process that improves concurrency of VM cloning and VM reconfiguration, such that a large number of nodes does go into the reconfiguration step at the same time, causing a bottleneck from services facilitating the reconfiguration (e.g., virtualization management module 130, DHCP servers).

It is recognized that the reconfiguration process shown in FIG. 5 may be used independently or in combination with the rapid VM cloning process shown in FIG. 4. For example, the VM cloning method 400 may be extended to generate a snapshot of the VM clone after creating a VM from the source VM to the selected target host (i.e., at step 420). Method 400 may be further extended to, at step 420, create the VM from a snapshot 504 of the source VM to the selected target host. Alternatively, method 400 may be extended to, at step 422, add only snapshot 504 of a VM clone to the pool of VMs available to be cloned, rather than VM 502 itself.

While embodiments of the present disclosure are described in the context of provisioning a plurality of virtual machines for use as nodes of a distributed computing application 124, it should be recognized that embodiments may be applied to for use in any virtualized environment having other types of applications. Embodiments enable a plurality of homogenous virtual machines that have the same VMDK to be rapidly provisioned and reconfigured.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present disclosure may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for provisioning a plurality of virtual machines (VMs) on a plurality of hosts, the method comprising:
   selecting a source virtual machine (VM) from a pool of VMs available to be cloned, wherein the selected source VM is on a source host;
   determining, for each of a plurality of hosts including the source host, a time to create a predetermined target number of VMs for the respective host on the respective host;
   selecting a target host from the plurality of hosts having a longest respective time to create the predetermined target number of VMs for the respective host;
   cloning the source VM to create a second VM on the selected target host; and
   adding the second VM to the pool of VMs available to be cloned.

2. The method of claim 1, wherein the time to create the predetermined target number of VMs for the respective host comprises a number of rounds of cloning to reach the predetermined target number of VMs on the respective host.

3. The method of claim 1, wherein determining, for each of the plurality of hosts including the source host, the time to create the predetermined target number of VMs for the respective host on the respective host, comprises:
   determining an source host weight value for the source host based on an existing number of VMs on the source host and a predetermined target number of VMs for the source host; and
   determining a cross-host weight value for a second host based on an existing number of VMs on the second host and a predetermined target number of VMs for the second host.

4. The method of claim 3, wherein selecting the target host from the plurality of hosts having the longest respective time to create further comprises:
  responsive to determining that the source host weight value exceeds the cross-host weight value, selecting the source host as the target host; and
  responsive to determining that the source host weight value does not exceed the cross-host weight value, selecting the second host as the target host.

5. The method of claim 3, wherein determining the cross-host weight value for the second host based on the existing number of VMs on the second host and the predetermined target number of VMs for the second host further comprises:
  determining a number of rounds of cloning to reach the target number of VMs on the second host by using both a source VM on the second host and a source VM from another host.

6. The method of claim 3, wherein determining the cross-host weight value for the second host based on the existing number of VMs on the second host and the predetermined target number of VMs for the second host further comprises:
  calculating a cross-host weight value for each of the plurality of hosts excluding the source host, each cross-host weight value comprising a number of rounds of cloning to reach a target number of VMs on the respective host; and
  determining that the cross-host weight value for the second host is a maximum cross-host weight value among the plurality of hosts excluding the source host.

7. The method of claim 1, further comprising:
  responsive to determining that a second host of the plurality of hosts does not have a VM clone, selecting the second host as the target host on which to create the second VM.

8. The method of claim 1, wherein a first plurality of the hosts including the source host are disposed in a first rack and a second plurality of the hosts are disposed in a second rack, wherein the method further comprises:
  responsive to determining that none of the second plurality of hosts disposed in the second rack have a VM clone, selecting one of the second plurality of hosts as the target host on which to create the second VM.

9. The method of claim 1, wherein cloning the source VM to create the second VM on the selected target host further comprises:
  cloning a snapshot of the source VM to create the second VM, while modifying a configuration of the source VM.

10. A non-transitory computer-readable storage medium comprising instructions that, when executed in a computing device, for provisioning a plurality of virtual machines (VMs) on a plurality of hosts, by performing the steps of:
  selecting a source virtual machine (VM) from a pool of VMs available to be cloned, wherein the selected source VM is on a source host;
  determining, for each of a plurality of hosts including the source host, a time to create a predetermined target number of VMs for the respective host on the respective host;
  selecting a target host from the plurality of hosts having a longest respective time to create the predetermined target number of VMs for the respective host;
  cloning the source VM to create a second VM on the selected target host; and
  adding the second VM to the pool of VMs available to be cloned.

11. The non-transitory computer-readable storage medium of claim 10, wherein the time to create the predetermined target number of VMs for the respective host comprises a number of rounds of cloning to reach the predetermined target number of VMs on the respective host.

12. The non-transitory computer-readable storage medium of claim 10, wherein the instructions for determining, for each of the plurality of hosts including the source host, the time to create the predetermined target number of VMs for the respective host on the respective host, further comprise instructions that when executed in the computing device perform the steps of:
  determining an source host weight value for the source host based on an existing number of VMs on the source host and a predetermined target number of VMs for the source host; and
  determining a cross-host weight value for a second host based on an existing number of VMs on the second host and a predetermined target number of VMs for the second host, wherein the cross-host weight value for the second host comprises a maximum cross-host weight value among the plurality of hosts excluding the source host.

13. The non-transitory computer-readable storage medium of claim 12, wherein the instructions for selecting the target host from the plurality of hosts having the longest respective time to create further comprise instructions that when executed in the computing device perform the steps of:
  responsive to determining that the source host weight value exceeds the cross-host weight value, selecting the source host as the target host; and
  responsive to determining that the source host weight value does not exceed the cross-host weight value, selecting the second host as the target host.

14. The non-transitory computer-readable storage medium of claim 12, wherein the instructions for selecting the target host from the plurality of hosts having the longest respective time to create further comprise instructions that when executed in the computing device perform the steps of:
  determining a number of rounds of cloning to reach the target number of VMs on the second host by using both a source VM on the second host and a source VM from another host.

15. The non-transitory computer-readable storage medium of claim 10, wherein the instructions for cloning the source VM to create the second VM on the selected target host further comprise instructions that when executed in the computing device perform the steps of:
  cloning a snapshot of the source VM to create the second VM, while modifying a configuration of the source VM.

16. A computer system, comprising:
  a plurality of hosts;
  a management device communicatively coupled to the plurality of hosts, wherein the management device comprises:
    a memory device storing computer-executable program code;
    a processor programmed to execute the computer-executable program code and carry out the steps of:
    selecting a source virtual machine (VM) from a pool of VMs available to be cloned, wherein the selected source VM is on a source host;
    determining, for each of the plurality of hosts including the source host, a time to create a predetermined target number of VMs for the respective host on the respective host;
    selecting a target host from the plurality of hosts having a longest respective time to create the predetermined target number of VMs for the respective host;

cloning the source VM to create a second VM on the selected target host; and adding the second VM to the pool of VMs available to be cloned.

17. The computer system of claim 16, wherein the time to create the predetermined target number of VMs for the respective host comprises a number of rounds of cloning to reach the predetermined target number of VMs on the respective host.

18. The computer system of claim 16, wherein the processor programmed to carry out the steps of determining, for each of the plurality of hosts including the source host, the time to create the predetermined target number of VMs for the respective host on the respective host, is further programmed to carry out the steps of:

determining an source host weight value for the source host based on an existing number of VMs on the source host and a predetermined target number of VMs for the source host; and determining a cross-host weight value for a second host based on an existing number of VMs on the second host and a predetermined target number of VMs for the second host, wherein the cross-host weight value for the second host comprises a maximum cross-host weight value among the plurality of hosts excluding the source host.

19. The computer system of claim 18, wherein the processor programmed to carry out the steps of selecting the target host from the plurality of hosts having the longest respective time to create is further programmed to carry out the steps of:

responsive to determining that the source host weight value exceeds the cross-host weight value, selecting the source host as the target host; and responsive to determining that the source host weight value does not exceed the cross-host weight value, selecting the second host as the target host.

20. The computer system of claim 16, wherein the processor programmed to carry out the steps of cloning the source VM to create the second VM on the selected target host is further programmed to carry out the steps of:

cloning a snapshot of the source VM to create the second VM, while modifying a configuration of the source VM.

* * * * *